(12) United States Patent
Mitchell

(10) Patent No.: US 10,184,815 B1
(45) Date of Patent: Jan. 22, 2019

(54) SYSTEM AND METHOD FOR DETERMINING FLUID VELOCITY

(71) Applicant: Bose Corporation, Framingham, MA (US)

(72) Inventor: Eric C. Mitchell, Upton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/686,522

(22) Filed: Aug. 25, 2017

(51) Int. Cl.
*G01F 1/32* (2006.01)

(52) U.S. Cl.
CPC .................. *G01F 1/3209* (2013.01)

(58) Field of Classification Search
CPC .................. G01F 1/3209; G01F 1/66
See application file for complete search history.

(56) References Cited

U.S. PATENT DOCUMENTS

| | | | |
|---|---|---|---|
| 2016/0334253 A1* | 11/2016 | Querry | G01P 5/14 |
| 2017/0188135 A1* | 6/2017 | Lage | H04R 1/2849 |
| 2018/0156651 A1* | 6/2018 | Schulz | B23B 35/00 |

* cited by examiner

*Primary Examiner* — Jewel V Dowtin

(57) ABSTRACT

A system for determining fluid velocity of a fluid flow to which the system is exposed, the system comprising: an acoustic structure including a radiating element and an acoustic volume acoustically coupled to the radiating element, a microphone located inside the acoustic volume, and a wire coupled to the radiating element such that, when the wire is subject to the fluid flow, vibrations of the wire are transmitted to the radiating element, and resulting vibrations of the radiating element radiate corresponding vibrations into the acoustic volume, wherein the microphone is sensitive to said vibrations radiated into the acoustic volume, and the output of the microphone in response to said vibrations is related to the fluid velocity of the fluid flow to which the wire is subject.

22 Claims, 1 Drawing Sheet

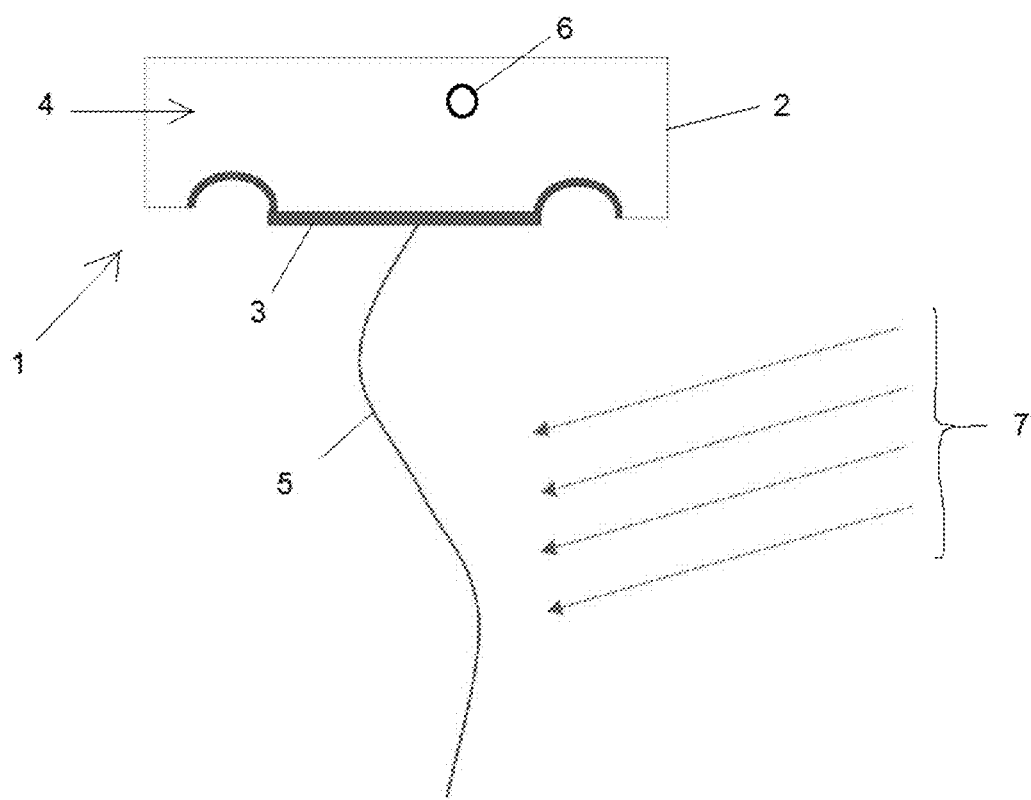

SYSTEM AND METHOD FOR DETERMINING FLUID VELOCITY

BACKGROUND

This disclosure relates to a system and method for determining fluid velocity of a fluid flow to which the system is exposed.

There are known techniques to determine fluid velocity of a fluid flow to which a system is exposed. These techniques include kinematic measurements where a fluid volume is marked and the motion of this volume is measured by appropriate instruments, dynamic methods that make use of a dynamic interaction between a fluid flow and a measuring probe, and physical measurements where physical processes, whose characteristics depend on velocity, are monitored. While all the known techniques have respective pros and cons, they can be quite complex and not necessarily applied in simple systems and/or by lay persons.

SUMMARY

The present invention proposes an alternative fluid velocity determination that can be applied in simple systems and/or in a fairly easy way.

In one aspect, the invention relates to a system for determining fluid velocity of a fluid flow to which the system is exposed, the system comprising: an acoustic structure including a radiating element and an acoustic volume acoustically coupled to the radiating element, a microphone located inside the acoustic volume, and a wire coupled to the radiating element such that, when the wire is subject to the fluid flow, vibrations of the wire are transmitted to the radiating element, and resulting vibrations of the radiating element radiate corresponding vibrations into the acoustic volume, wherein the microphone is sensitive to said vibrations radiated into the acoustic volume, and the output of the microphone in response to said vibrations is related to the fluid velocity of the fluid flow to which the wire is subject.

Embodiments may include one of the following features, or any combination thereof:

the system further comprises a processor configured to determine, from the output of the microphone, fluid velocity of the fluid flow to which the wire is subject;

the system comprises a headphone, and wherein the wire, the acoustic structure and the microphone are parts of the headphone;

the processor is further configured to determine the fluid velocity of the fluid flow to which the wire is subject, by calculating $f \cdot D / S_T$, where f is a frequency of vortex shedding of the fluid flow and is derived from the sensed vibrations, D is a diameter of the wire and $S_T$ is a Strouhal number of the wire, wherein the wire of the headphone has a diameter for which the Strouhal number $S_T$ of the wire is substantially constant in a fluid velocity range of interest;

the fluid flow comprises wind to which the system is exposed when the system is stationary and wherein the processor is further configured to use the determined fluid velocity to estimate wind velocity;

the fluid flow comprises wind to which the system is exposed when moving and wherein the processor is further configured to use the determined fluid velocity to estimate a speed at which the system moves;

the processor is further configured to use the determined fluid velocity to modify audio delivered by the headphone;

the processor is further configured to use the determined fluid velocity to estimate a movement speed of a user of the headphone;

the wire comprises a cable of the headphone that is arranged for coupling the headphone to an external device;

the wire comprises a wire of the headphone that is arranged for connecting two earbuds of the headphone;

the wire is fully dedicated to contributing to determine fluid velocity of the fluid flow to which the system is exposed;

the acoustic volume includes a cavity of an earbud of the headphone and at least part of an ear canal of a user of the headphone that is acoustically coupled to said cavity;

the wire has a diameter for which the Strouhal number $S_T$ of the wire is substantially constant in a fluid velocity range of interest.

In another aspect, the invention relates to an apparatus for determining fluid velocity of a fluid flow to which the apparatus is exposed, the apparatus comprising: an acoustic structure including a radiating element and an acoustic volume acoustically coupled to the radiating element, a microphone located inside the acoustic volume, and a wire coupled to the radiating element such that, when the wire is subject to the fluid flow, vibrations of the wire are transmitted to the radiating element, and resulting vibrations of the radiating element radiate corresponding vibrations into the acoustic volume, wherein the microphone is sensitive to said vibrations radiated into the acoustic volume, and the output of the microphone in response to said vibrations is related to the fluid velocity of the fluid flow to which the wire is subject.

In another aspect, the invention relates to a method of determining fluid velocity of a fluid flow to which a system is exposed, the system comprising a wire, an acoustic structure including a radiating element and an acoustic volume acoustically coupled to the radiating element, and a microphone located inside the acoustic volume, the wire being coupled to the radiating element so that, when the wire is subject to the fluid flow, vibrations of the wire are transmitted to the radiating element, and resulting vibrations of the radiating element radiate corresponding vibrations into the acoustic volume, the method comprising: sensing said vibrations radiated into the acoustic volume by means of the microphone, determining, from the sensed vibrations, fluid velocity of the fluid flow to which the wire is subject.

BRIEF DESCRIPTION OF THE DRAWINGS

FIG. 1 is a schematic view of an example system implementing the invention.

DETAILED DESCRIPTION

FIG. 1 shows a system 1. The system 1 can be of any type of system. It may have any shape and/or function. It may consist in a single apparatus or alternatively comprise multiple devices either co-located or possibly distributed over different locations. In an advantageous embodiment that will be particularly discussed further below, the system may consist in or comprise a headphone. The headphone may be of any type, including an on-ear, around-ear or in-ear headphone.

The acoustic structure 2 may be any structure comprising a radiating element 3 and an acoustic volume 4 acoustically coupled to the radiating element 3. As a non-limiting example, the radiating element 3 may comprise a passive radiator. As another non-limiting example, the radiating element 3 may comprise any mass acoustically coupled to the acoustic volume 4 via a spring. The acoustic volume 4 may be an entirely or partially closed space. In an example, the radiating element 3 may form or cover at least part of a side of the acoustic volume 4.

In the non-limiting example where the system 1 comprises a headphone worn by a user, the acoustic volume 4 may include a cavity of an earbud (or earphone) of the headphone and at least part of an ear canal of the user of the headphone, that is acoustically coupled to the cavity. And the radiating element 3 may be part or the entirety of an electro-acoustic transducer of the headphone, that may be the same transducer as that used to deliver audio content to the headphone or, alternatively, a different transducer. In another example, the radiating element 3 may be part or the entirety of the earbud itself. It should be noted that the radiating element 3 need not be part of the sound-generating apparatus of the headphone. For purposes of this disclosure, as detailed below, it is an ability of the radiating element to radiate energy into the acoustic volume 4 that is needed, not any ability to radiate sound out of the headphone.

A microphone 6 is located inside the acoustic volume 4. It can be any type of known microphone, such as a MEMS microphone or other. When the system 1 comprises a headphone, the microphone 6 may be the same as a microphone used by the headphone for conventional functions, such as to pick up voice from the headphone user and/or to contribute to a feedback loop in a noise reduction capability. Alternatively, the microphone 6 may be a different microphone, dedicated to contributing to determine fluid velocity of the fluid flow to which the headphone is exposed as will be explained further below.

The wire 5 is coupled to the radiating element 3. This coupling is typically a mechanical coupling, although other forms of coupling such as an electric or an electronic coupling and/or a mix of mechanical, electric and/or electronic coupling are also possible. As a result of the system 1 being exposed to a fluid flow 7, the wire 5 is subject to the flow and may vibrate under the influence of this flow. The vibrations of the wire 5 depend on characteristics of the fluid flow 7, such as its velocity. Advantageously, the materials, shape and structure of the wire can be chosen to respond to a fluid flow velocity range of interest in a way that is representative, i.e. in a noticeable and measurable way, but not excessively.

The wire 5 may be a pre-existing part of the system 1, that is used for some conventional functions. When the system 1 comprises a headphone, the wire 5 may belong to that headphone. For example, the wire 5 may consist in or comprise the conventional cable of the headphone that is used for coupling the headphone to an external device, such as a phone, a music player, a computer, or any audio source device. Additionally or alternatively, the wire 5 may consist in or comprise a wire of the headphone that is used for connecting two earbuds of the headphone. In another embodiment, the wire 5 may be an add-on to an existing system, and be fully dedicated to the purpose of contributing to determine fluid velocity of the fluid flow 7 to which the system 1 is exposed. The system 1 may thus be equipped with a wire for the specific purpose of determining fluid velocity of the fluid flow 7 to which the system is exposed.

The wire 5 is coupled to the radiating element 3 of the acoustic structure 2, in such a way that, when the wire 5 is subject to the fluid flow 7, vibrations of the wire are transmitted to the radiating element 3, and resulting vibrations of the radiating element 3 radiate corresponding vibrations into the acoustic volume 4 of the acoustic structure 2. In this way, vibrations representative of (for example, proportional to) the fluid flow velocity can be relayed into the acoustic volume 4. Ensuring a transmission of the wire vibrations to the radiating element 3 may be achieved by simply connecting the wire 5 and the radiating element 3 together mechanically, but there are other possibilities as well as will be apparent to the skilled person.

Even when the system 1 is a headphone, the radiating element 3 belongs to a conventional headphone transducer and the wire 5 is a conventional headphone cable or wire used for other purposes in addition to contributing to determine fluid velocity, it should be noted that such a headphone nevertheless differs from prior art headphones in that the wire 5 is coupled to the radiating element 3.

The fluid flow 7 can be of any type. For example, it can be an air flow, such as a wind flow to which the system 1 can be exposed when it is used outdoors. In another example, it can be wind that results from a motion of the system 1. For instance, if the system 1 is a headphone worn by a user, the wind in question may be an air flow that is generated when the user walks, runs or bikes. In still another example, the fluid may be different from air. For instance, the fluid may be water and the water flow may result, e.g., from a waterproof headphone user swimming in a pool or sea.

The microphone 6 is sensitive to the vibrations radiated into the acoustic volume 4 in response to the vibrations of the wire 5. As it is located in the acoustic volume 4 where the vibrations are radiated by the radiating element 3, the microphone 6 can pick up those vibrations. When the vibrations in question are in the audio range, where a typical microphone will be sensitive to such vibrations, the microphone 6 will pick up the resulting sounds. Otherwise, the microphone 6 may be modified to pick up the vibrations outside the audio range. Because the system 1 is built to radiate vibrations in the acoustic volume 4 that are related to the fluid velocity, by means of the wire 5 and radiating element 3, when picking up these vibrations, the microphone 6 can then deliver an output that is related to the fluid velocity of the fluid flow 7 to which the wire 5 is subject. The output of the microphone 6 may be proportional to the fluid velocity, or be otherwise related to the fluid velocity so that the fluid velocity can be determined from this output.

Advantageously, the system 1 may comprise a processor configured to determine, from the output of the microphone 6, the fluid velocity of the fluid flow 7 to which the wire 5 is subject. When the system 1 comprises a headphone, the processor may be part of the headphone itself, or it may be part of at least another element distinct from the headphone, such as an external device connected to the headphone in a wired or wireless way, and/or a distant server receiving the microphone output and deriving the fluid velocity therefrom.

In a non-limiting example, the determination of the fluid velocity from the vibrations sensed by the microphone 6 in the acoustic volume 4 is performed by calculating $$\frac{f \cdot D}{S_T},$$

where f is a frequency of vortex shedding of the fluid flow 7 off wire 5, and is derived from the vibrations sensed by the microphone 6, D is a diameter of the wire 5 and $S_T$ is a Strouhal number of the wire 5. The microphone 6 may pick up a time domain signal of which the frequency f of the vortex shedding is included. A Fast Fourier transform (FFT) will represent the frequency domain of that signal where the vortex shedding frequency f can be determined. As is well-known in fluid mechanics, the Strouhal number is a dimensionless number that describes the relationship between vortex shedding frequency and fluid velocity. It generally depends on the width and geometry of the shedding body, which can be approximated to the diameter D of the wire 5 in this case. Therefore, having a wire 5 of substantially constant diameter in cross-section may be advantageous for simplicity.

Advantageously, the wire 5 may be designed to have a diameter D for which the Strouhal number $S_T$ of the wire is substantially constant in a fluid velocity range of interest. This can be achieved due to that the Strouhal number is a function of geometry and Reynolds number (Re), which is another well-known dimensionless quantity in fluid mechanics. A curve (Re, $S_T$) can be determined experimentally and it generally has a constant Strouhal number for a large range of Reynolds numbers. Selecting a constant Strouhal number, although not required, can be advantageous. In this way, in the range of interest, the calculated value $$\frac{f \cdot D}{S_T}$$

may be proportional to the frequency f of vortex shedding of the fluid flow 7, which makes it particularly easy to estimate. For example, assuming that the range of interest is for frequencies of vortex shedding around 260 Hz, the diameter of the wire is 0.002 m and the Strouhal number $S_T$ of the wire is 0.2, the derived fluid velocity of the fluid flow would have a value of 2.6 m/s. Or to put it differently, the fluid velocity range of interest (e.g. wind speed or human movement speed) can lead to a diameter selection that puts f in the audible range and a constant Strouhal number.

It is worth noting that the value $$\frac{f \cdot D}{S_T}$$

does not depend on characteristics of the wire 5, others than its diameter (for a wire having a round cross-section). Therefore, wires of different lengths will give the same results, though the signal to noise ratio (SNR) may be higher for a longer wire compared to a shorter wire.

In experiments performed on wind velocity between 1 and 8 m/s, the method and system described above have led to low error rates, in the order of 5%.

Once determined, the fluid velocity of the fluid flow can be used in many different applications. For example, a processor of the system 1 may use the fluid velocity estimate to determine other values and/or to perform specific actions and/or to control an adaptive system.

In a non-limiting example where the fluid flow 7 comprises wind to which the system 1 is exposed, the processor can be configured to use the determined fluid velocity to estimate wind velocity. When the system 1 is stationary, the wind velocity may just be the same as the determined fluid velocity, or it may be derived therefrom after applying some corrections, like averaging or else.

In another example where the fluid flow 7 comprises wind to which the system 1 is exposed when moving, the processor can be configured to use the determined fluid velocity to estimate a speed at which the system moves. If the system is indoor, the estimate speed may be directly derived from the determined fluid velocity, because the wind in question is entirely or mainly caused by the system motion. If the system is at least partly outdoor, then the wind may be a combination of natural wind and wind caused by the system motion. In this case, estimating the system speed may require further steps, such as making a preliminary determination of the natural wind velocity (at a time when the system is stationary) and then subtracting it from the determined fluid velocity. In other examples, the system's speed may be known from other sources, such as accelerometers in the system or in another device, and used to extract the speed of the natural wind from the total air speed measured.

When the system 1 is used by a user, for example if it is a headphone worn by a user, the determined fluid velocity may be used to estimate a movement speed of that user. This can be helpful, e.g., for headphone users who wish to track their performance when walking, running or biking for instance.

In another example where the system 1 comprises a headphone, the processor of the system 1 can be configured to use the determined fluid velocity to modify audio delivered by the headphone. For instance, when the fluid velocity is determined to have a high value, the volume of audio delivered by the headphone may be increased and/or an ambient noise reduction feature may be activated or intensified to help the headphone user to better hear audio content without being bothered by wind noise.

A number of implementations have been described. Nevertheless, it will be understood that additional modifications may be made without departing from the scope of the inventive concepts described herein, and, accordingly, other embodiments are within the scope of the following claims.

The invention claimed is:

1. A system for determining fluid velocity of a fluid flow to which the system is exposed, the system comprising:
   an acoustic structure including a radiating element and an acoustic volume acoustically coupled to the radiating element,
   a microphone located inside the acoustic volume, and
   a wire coupled to the radiating element such that, when the wire is subject to the fluid flow, vibrations of the wire are transmitted to the radiating element, and resulting vibrations of the radiating element radiate corresponding vibrations into the acoustic volume, wherein
   the microphone is sensitive to said vibrations radiated into the acoustic volume, and
   the output of the microphone in response to said vibrations is related to the fluid velocity of the fluid flow to which the wire is subject.

2. The system of claim 1, further comprising a processor configured to determine, from the output of the microphone, fluid velocity of the fluid flow to which the wire is subject.

3. The system of claim 1 or 2, wherein the system comprises a headphone, and wherein the wire, the acoustic structure and the microphone are parts of the headphone.

4. The system of claim 3, wherein the processor is further configured to determine the fluid velocity of the fluid flow to which the wire is subject, by calculating $f \cdot D/S_T$, where f is a frequency of vortex shedding of the fluid flow and is derived from the sensed vibrations, D is a diameter of the wire and $S_T$ is a Strouhal number of the wire, wherein the wire of the headphone has a diameter for which the Strouhal number $S_T$ of the wire is substantially constant in a fluid velocity range of interest.

5. The system of claim 2, wherein the fluid flow comprises wind to which the system is exposed when the system is stationary and wherein the processor is further configured to use the determined fluid velocity to estimate wind velocity.

6. The system of claim 2, wherein the fluid flow comprises wind to which the system is exposed when moving and wherein the processor is further configured to use the determined fluid velocity to estimate a speed at which the system moves.

7. The system of claim 3, wherein the processor is further configured to use the determined fluid velocity to modify audio delivered by the headphone.

8. The system of claim 3, wherein the processor is further configured to use the determined fluid velocity to estimate a movement speed of a user of the headphone.

9. The system of claim 3, wherein the wire comprises a cable of the headphone that is arranged for coupling the headphone to an external device.

10. The system of claim 3, wherein the wire comprises a wire of the headphone that is arranged for connecting two earbuds of the headphone.

11. The system of claim 3, wherein the wire is fully dedicated to contributing to determine fluid velocity of the fluid flow to which the system is exposed.

12. The system of claim 3, wherein the acoustic volume includes a cavity of an earbud of the headphone and at least part of an ear canal of a user of the headphone that is acoustically coupled to said cavity.

13. The system of claim 4, wherein the wire has a diameter for which the Strouhal number $S_T$ of the wire is substantially constant in a fluid velocity range of interest.

14. An apparatus for determining fluid velocity of a fluid flow to which the apparatus is exposed, the apparatus comprising:
an acoustic structure including a radiating element and an acoustic volume acoustically coupled to the radiating element,
a microphone located inside the acoustic volume, and
a wire coupled to the radiating element such that, when the wire is subject to the fluid flow, vibrations of the wire are transmitted to the radiating element, and resulting vibrations of the radiating element radiate corresponding vibrations into the acoustic volume,
wherein
the microphone is sensitive to said vibrations radiated into the acoustic volume, and
the output of the microphone in response to said vibrations is related to the fluid velocity of the fluid flow to which the wire is subject.

15. The apparatus of claim 14, comprising a headphone.

16. A method of determining fluid velocity of a fluid flow to which a system is exposed, the system comprising a wire, an acoustic structure including a radiating element and an acoustic volume acoustically coupled to the radiating element, and a microphone located inside the acoustic volume, the wire being coupled to the radiating element so that, when the wire is subject to the fluid flow, vibrations of the wire are transmitted to the radiating element, and resulting vibrations of the radiating element radiate corresponding vibrations into the acoustic volume, the method comprising:
sensing said vibrations radiated into the acoustic volume by means of the microphone,
determining, from the sensed vibrations, fluid velocity of the fluid flow to which the wire is subject.

17. The method of claim 16, wherein the system comprises a headphone.

18. The method of claim 17, wherein the wire comprises any one of: a cable of the headphone that is arranged for coupling the headphone to an external device, a wire of the headphone that is arranged for connecting two earbuds of the headphone, and a wire fully dedicated to contributing to determine fluid velocity of the fluid flow to which the headphone is exposed.

19. The method of claim 16, wherein the fluid flow comprises wind to which the system is exposed when the system is stationary or moves and wherein the determined fluid velocity is used to estimate: wind velocity and/or a speed at which the system moves.

20. The method of claim 17, further comprising using the determined fluid velocity to: modify audio delivered by the headphone and/or estimate a movement speed of a user of the headphone.

21. The method of claim 16, wherein determining, from the sensed vibrations, fluid velocity of the fluid flow to which the wire is subject comprises calculating $f \cdot D/S_T$, where f is a frequency of vortex shedding of the fluid flow and is derived from the sensed vibrations, D is a diameter of the wire and $S_T$ is a Strouhal number of the wire.

22. The method of claim 21, wherein the wire has a diameter for which the Strouhal number $S_T$ of the wire is substantially constant in a fluid velocity range of interest.

* * * * *